United States Patent [19]

Sugiyama et al.

[11] 4,402,070

[45] Aug. 30, 1983

[54] TRANSFER CONTROL DEVICE FOR A REPRODUCING TRANSDUCER IN A ROTARY RECORDING MEDIUM REPRODUCING APPARATUS

[75] Inventors: Hiroyuki Sugiyama, Isehara; Isami Kaneda, Yokohama; Susumu Sakakibara, Sagamihara; Ryozo Abe, Yokohama; Yasushi Sano, Yamato, all of Japan

[73] Assignee: Victor Company of Japan, Ltd., Yokohama, Japan

[21] Appl. No.: 301,212

[22] Filed: Sep. 11, 1981

[30] Foreign Application Priority Data

Sep. 12, 1980 [JP] Japan ................................ 55-126887

[51] Int. Cl.³ .................... H04N 5/76; G11B 3/10; G11B 21/02
[52] U.S. Cl. ...................... 369/43; 358/312; 358/342; 358/907; 360/10.2; 369/44
[58] Field of Search ............. 358/312, 313, 322, 335, 358/342, 907; 360/10.1, 10.2, 11.1; 369/43, 44, 215

[56] References Cited

U.S. PATENT DOCUMENTS 3,993,863 11/1976 Leedom et al. .................. 369/43 X
4,310,914 1/1982 Riddle ............................. 358/342 X
4,321,622 3/1982 Jerome et al. .................... 369/44 X

*Primary Examiner*—Robert L. Richardson
*Attorney, Agent, or Firm*—Louis Bernat

[57] ABSTRACT

A transfer control device for a reproducing transducer in a rotary recording medium reproducing apparatus having a reproducing transducer for reproducing recorded signals from a rotary recording medium and a driving motor for transferring said reproducing transducer on said rotary recording medium comprises a micro-computer having first and second output ports, where the first output port produces a signal of a pulse form which repeats high-level and low-level periods during a normal-speed transferring mode, and the second output port produces a continuous high-level or low-level signal according to the transferring mode so that a combination of a predetermined level is obtained between the output signal from the first output port, a square wave signal generating circuit applied with the output signal from the first output port of the microcomputer, where the square wave signal generating circuit is triggered to produce a predetermined square wave signal when applied with the signal of a pulse form and not triggered when applied with other signals of constant level, and a switching circuit applied with the output signal from the first and second output ports of the micro-computer, to switch over a plurality of input terminals according to the levels of the applied signals and pass the input terminal voltage through to an output side as an output voltage. The switching circuit supplies the output voltage thus obtained to the driving motor.

6 Claims, 14 Drawing Figures

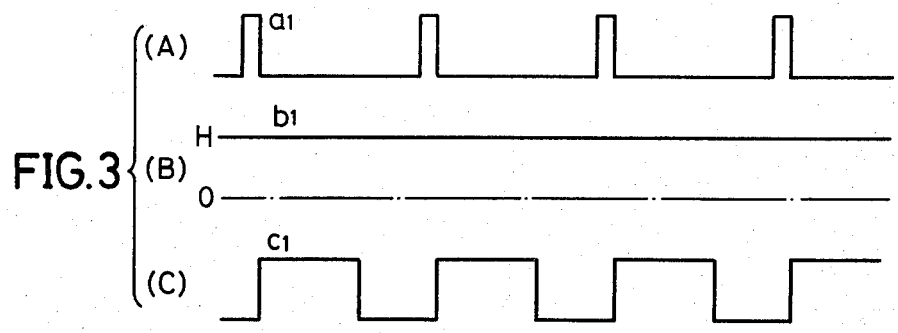
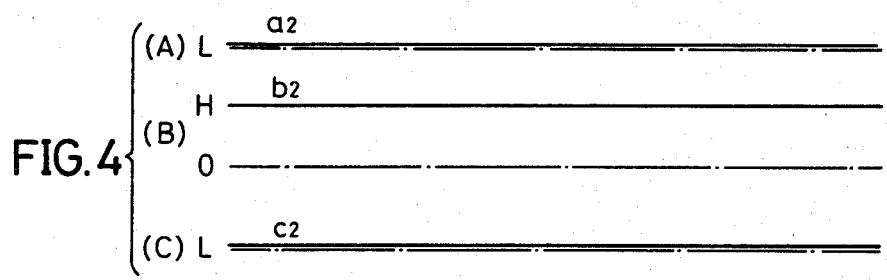
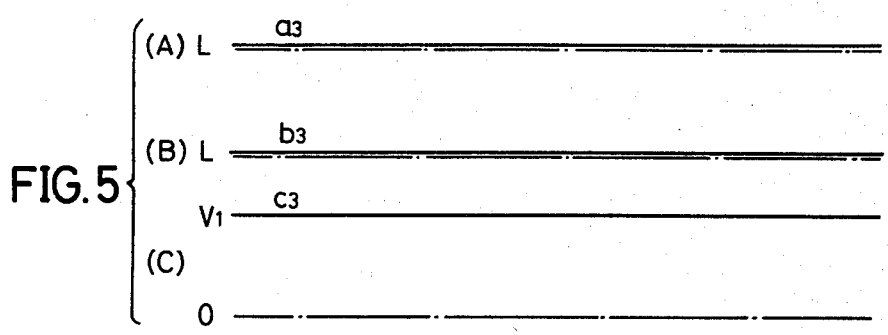
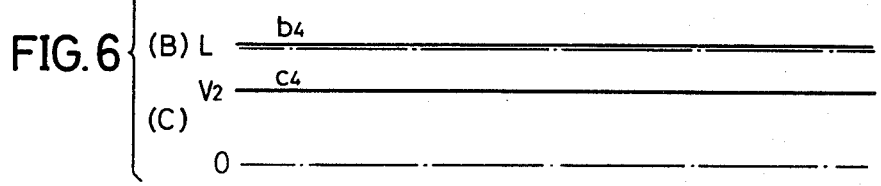

TRANSFER CONTROL DEVICE FOR A REPRODUCING TRANSDUCER IN A ROTARY RECORDING MEDIUM REPRODUCING APPARATUS

BACKGROUND OF THE INVENTION

The present invention generally relates to transfer control devices for reproducing transducers in rotary recording medium reproducing apparatuses, and more particularly to a transfer control device capable of switching over to perform a high-speed transfer, an intermediate-speed transfer, and a normal-speed transfer of the reproducing transducer, by use of a small number of output ports of a micro-computer.

Systems have been realized in which a recording system forms pits in accordance with information signal being recorded along a spiral track on a flat rotary recording medium (hereinafter referred to as disc), without forming a groove therein, and a reproducing stylus traces over along this track to reproduce the recorded information signal in response to variations in the electrostatic capacitance in a reproducing system.

In this system, since no groove is provided on the disc for guiding the reproducing stylus, pilot or reference signals are recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

In the above described system, since the disc surface is flat having no grooves for guiding the reproducing stylus, the reproducing stylus can be transferred in a rapid manner towards the radial direction of the disc unto a predetermined position without whatsoever damaging the reproducing stylus or the disc. That is, a so-called random access operation and the like can be performed in the above system. In the random access operation, the reproducing transducer is initially transferred at a high speed, then the transferring speed is switched over to an intermediate speed when the reproducing transducer reaches a position in the vicinity of an intended position, and the transfer of the reproducing transducer is finally stopped when the reproducing transducer reaches the intended position. The above random access operation is performed while addresses on the disc are detected. Moreover, during normal reproduction, the reproducing transducer is transferred at a normal speed. Accordingly, as a transferring speed for the reproducing transducer, there are the following three kinds of speeds.

(1) Normal transferring speed
(2) Intermediate speed: 250 times the normal transferring speed, for example.
(3) High speed: 1200 times the normal transferring speed, for example.

Furthermore, the normal transferring speed is used for a normal reproducing mode through a 65-times speed reproducing mode. During normal reproducing mode, the reproducing transducer performs reproduction in terms of one track. In addition, during 65-times speed reproducing mode, for example, the reproducing stylus is successively kicked to an adjacent track at 64 positions for one revolution of the disc. During the above modes in which the reproducing transducer is transferred in a normal manner, a feed pulse is supplied to a feed motor every 32 tracks of the disc (every 32 revolutions of the disc during normal reproducing mode, and every 16 revolutions of the disc during 2-times speed reproducing mode, for example), regardless of multiple speed reproducing mode, to transfer the reproducing transducer.

A control signal is obtained from a micro-computer according to the mode of the transferring speed of the reproducing transducer, and supplied to a feed motor drive control circuit to perform a rotational speed control operation with respect to the feed motor.

However, various kinds of control signals were conventionally used to perform the above speed control operation. Therefore, a plurality of output ports of the micro-computer were used for producing the various control signals.

SUMMARY OF THE INVENTION

Accordingly, it is a general object of the present invention to provide a novel and useful transfer control device for a reproducing transducer in a rotary recording medium reproducing apparatus, in which the above described problems have been overcome.

Another and more specific object of the present invention is to provide a transfer control device for a reproducing transducer in a rotary recording medium reproducing apparatus, capable of performing a control operation to control each of the above described transferring speed modes of the reproducing transducer by use of control signals, wherein the control signals are constructed so that only two output ports of a micro-computer are required.

Other objects and further features of the present invention will be apparent from the following detailed description when read in conjunction with the accompanying drawings.

BRIEF DESCRIPTION OF THE DRAWINGS

FIGS. 3(A) through 3(C) are diagrams respectively showing signal waveforms at each part of the device shown in FIG. 2 during a normal transfer mode;

FIGS. 4(A) through 4(C) are diagrams respectively showing signal waveforms at each part of the device shown in FIG. 2 during a stop mode;

FIGS. 5(A) through 5(C) are diagrams respectively showing signal waveforms at each part of the device shown in FIG. 2 during a high-speed transfer mode; and FIGS. 6(A) through 6(C) are diagrams respectively showing signal waveforms at each part of the device shown in FIG. 2 during an intermediate-speed transfer mode.

DETAILED DESCRIPTION

Figure 1:
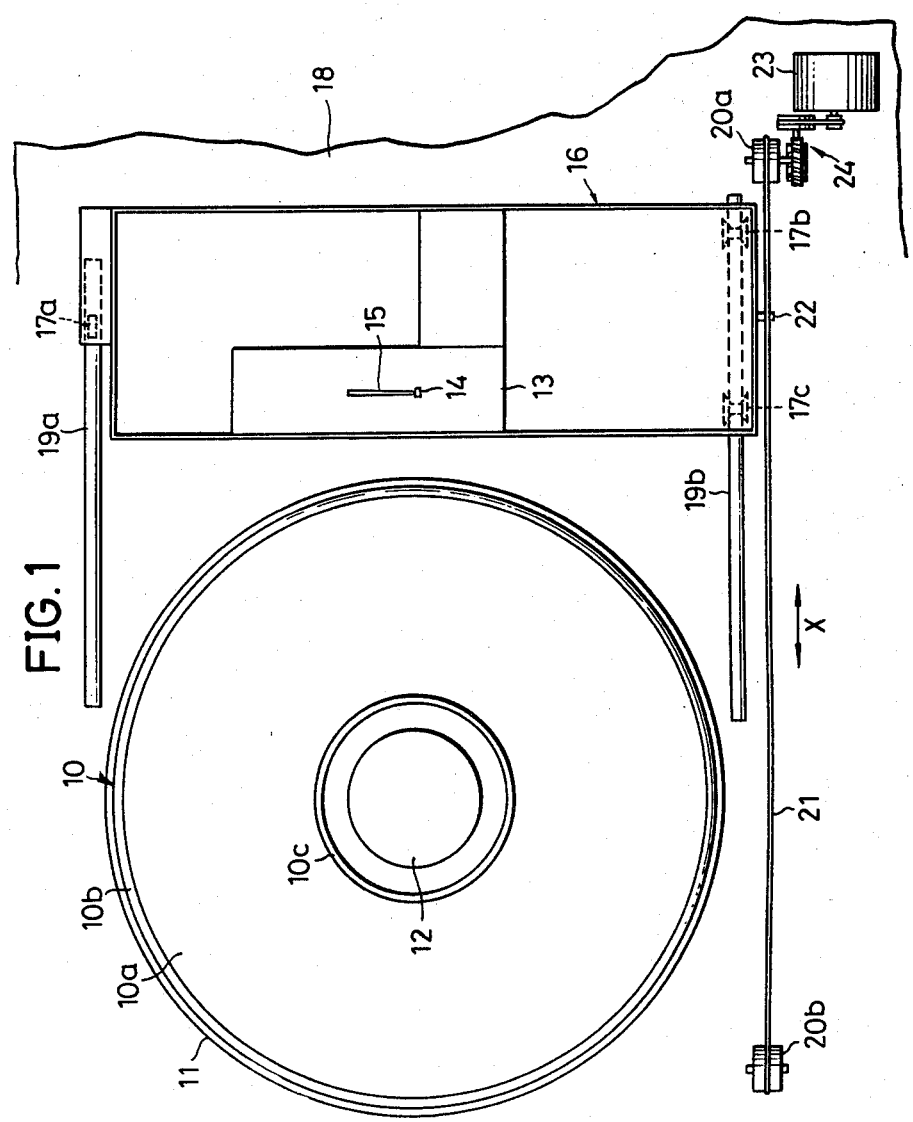
FIG. 1 is a plan view showing an example of a rotary recording medium reproducing apparatus which can be applied with a transfer control device for a reproducing transducer according to the present invention.

In FIG. 1, a disc 10 is placed on a turntable 11, and clamped by a clamper 12. The disc 10 is rotated at a rotational speed of 900 rpm, for example. Further, groove guards 10b and 10c are respectively provided at an outermost peripheral edge part and an innermost peripheral part of the disc 10, so that a recorded region 10a of the disc 10 does not make contact with the turntable 11. An information signal such as a video signal and an audio signal and reference signals for tracking control, are recorded in the recorded region 10a of the disc 10.

A reproducing transducer 13 comprises a pickup device including a cantilever 15 provided with a reproducing stylus 14, a resonator (not shown), and the like, and is mounted to a carriage 16. The carriage 16 has flange parts provided unitarily at both sides thereof, and the flanges have freely rotatable rollers 17a, 17b, and 17c. The roller 17a rolls over a rail 19a provided on a chassis 18 of the reproducing apparatus, and the rollers 17b and 17c respectively roll over a rail 19b. Accordingly, the carriage 16 moves in the direction of an arrow X.

A belt or a wire 21 is provided across pulleys 20a and 20b. A projection 22 of the carriage 16 is fixedly provided at a part of the wire 21. The rotation of a motor 23 is transmitted to the pulley 20a through a rotation transmitting mechanism 24 including a worm and a worm gear. Accordingly, the pulley 20a rotates as the motor 23 rotates, and the wire 21 is accordingly transferred towards the direction of the arrow X. Hence, the carriage 16 is also transferred towards the direction of the arrow X.

Upon normal reproduction, tracking control is performed with respect to the reproducing stylus 14 of the reproducing transducer 13 by a tracking control signal formed from reproduced reference signals, so that the reproducing stylus 14 always scan over the tracks.

Figure 2:
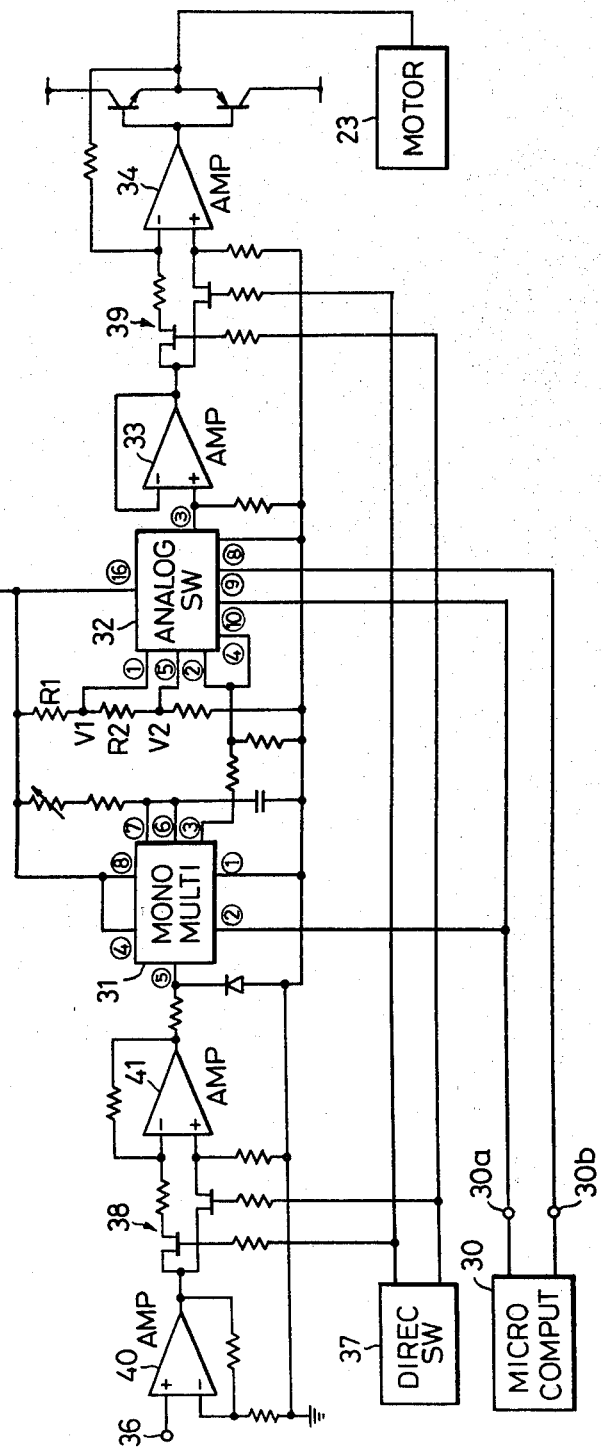
FIG. 2 is a systematic circuit diagram showing an embodiment of a transfer control device for a reproducing transducer according to the present invention.

Description will now be given with respect to an embodiment of a device for controlling the transferring speed of the reproducing transducer 13 by controlling the rotational speed of the motor 23 according to the operational mode of the reproducing apparatus, by referring to FIG. 2.

First, during a normal transferring speed mode, a pulse signal al is produced from an output port 30a of a micro-computer 30. The above pulse signal al is produced at the rate of once every 32 tracks of the disc 10, where the pulse signal al becomes of high (H) level from a low (L) level, as shown in FIG. 3(A). The pulse signal al is supplied to a terminal ② of a monostable multivibrator 31 and a terminal ⑩ of an analog switch circuit 32. Moreover, a H-level signal b1 shown in FIG. 3(B) is obtained from an output port 30b of the micro-computer 30, and applied to a terminal ⑨ of the analog switching circuit 32.

The above monostable multivibrator 31 is triggered by a falling edge of the signal al which is applied to the terminal ② of the monostable multivibrator 31. Hence, a signal c1 shown in FIG. 3(C) is obtained through a terminal ③ of the monostable multivibrator 31. In either cases where the signal level at the terminals ⑩ and ⑨ of the analog switching circuit 32 are of L-level and H-level, and H-level and H-level, the output obtained from the terminal ③ of the monostable multivibrator 31 is passed as it is through an output terminal ③ of the analog switching circuit 32.

The signal obtained through the output terminal ③ of the analog switching circuit 32 which has a waveform identical to the waveform shown in FIG. 3(C), is supplied to the motor 23 through amplifiers 33 and 34. Accordingly, the motor 23 is rotated every time the reproducing stylus 14 scans 32 tracks, to transfer the reproducing transducer 13 at a normal speed.

A direct current component of the tracking error signal obtained for performing tracking control with respect to the reproducing stylus 14, is applied to a terminal 36. Hence, during the normal transferring mode, the reproducing transducer 13 is transferred by the motor 23 in a manner such that the reproducing stylus 14 and the cantilever 15 are displaced about a neutral position of the cantilever 15. The above direct current component is applied to a terminal ⑤ of the monostable multivibrator 31 through amplifiers 40 and 41.

Next, during a stop mode, a L-level signal a2 and a H-level signal b2 shown in FIGS. 4(A) and 4(B) are respectively produced from the output ports 30a and 30b of the micro-computer 30.

Since the signal a2 applied to the terminal ② of the monostable multivibrator 31 is a L-level signal, the monostable multivibrator 31 is not triggered. Thus, the output obtained from the terminal ③ of the monostable multivibrator 31 remains at L-level as shown in FIG. 4(C). Moreover, because the signal levels at the terminals ⑩ and ⑨ of the analog switching circuit 32 respectively are of L-level and H-level, a L-level signal c2 obtained from the terminal ③ of the monostable multivibrator 31 is passes as it is through the analog switching circuit 32. Therefore, no voltage becomes applied to the motor 23 to stop the rotation of the motor 23, and the stop mode is accordingly obtained.

Next, during a high-speed transferring mode, L-level signals a3 and b3 shown in FIGS. 5(A) and 5(B) are respectively produced from the output ports 30a and 30b of the micro-computer 30. The monostable multivibrator 31 is not triggered in this mode, and the signal level at the terminal ③ of the monostable multivibrator 31 remains at L-level.

The analog switching circuit 32 passes the voltage applied to a terminal ① through the terminal ③, since the signal levels at the terminals ⑩ and ⑨ are respectively of L-levels. A voltage V is applied to a terminal 35, and a voltage V1 shown in FIG. 5(C) is applied to the terminal ① through a resistor R1. Accordingly, a signal c3 having the voltage V1 which is shown in FIG. 5(C), is obtained from the terminal ③ of the analog switching circuit 32, and then applied to the motor 23 through the amplifiers 33 and 34. Therefore, the motor 23 is rotated at a high speed, and the reproducing transducer 13 is transferred at a high transferring speed.

On the other hand, during an intermediate-speed transferring mode, a H-level signal a4 and a L-level signal b4 shown in FIGS. 6(A) and 6(B) are respectively produced from the output ports 30a and 30b of the micro-computer 30. The monostable multivibrator 31 is not triggered, and the signal level at the output terminal ③ remains at L-level.

Because the signal levels at the terminals ⑩ and ⑨ of the analog switching circuit 32 are respectively of H-level and L-level, the voltage obtained at the terminal 5 is passed through the terminal ③. A voltage V2 shown in FIG. 6(C) is applied to the terminal ⑤ of the analog switching circuit 32 through resistors R1 and R2. Accordingly, a signal c4 shown in FIG. 6(C) is obtained from the terminal ③ of the above analog switching circuit 32 and supplied to the motor 23. Therefore, the motor 23 is rotated at an intermediate speed, and the reproducing transducer 13 is accordingly transferred at an intermediate transferring speed.

According to whether the direction towards which the reproducing transducer 13 is transferred, that is towards a forward direction or a backward direction, a switching signal is applied to switching circuits 38 and 39 from a direction switching circuit 37, to switch over the polarity. Hence, the motor 23 is rotated towards the forward direction during a forward mode, and rotated towards a backward direction during a backward mode.

Further, the present invention is not limited to these embodiments, but various variations and modifications may be made without departing from the scope of the invention.

What is claimed is:

1. A transfer control device for a reproducing transducer in a rotary recording medium reproducing apparatus having a reproducing transducer for reproducing recorded signals from a rotary recording medium and a driving motor for transferring said reproducing transducer on said rotary recording medium, said transfer control device comprising: a micro-computer having first and second output ports, said first
   output port producing a signal of a pulse form which repeats high-level and low level periods during a normal-speed transferring mode, said second output port producing a continuous high-level or low-level signal according to the transferring mode so that predetermined combinations of high and low level signals are obtained from the first and second output ports;
   a square wave signal generating circuit applied with the output signal from said first output port of said micro-computer, said square wave signal generating circuit being triggered to produce a predetermined square wave signal when applied with said signal of a pulse form and not triggered when applied with other signals of constant level; and
   a switching circuit applied with the output signals from said first and second output ports of said micro-computer, to switch over a plurality of input terminals according to the levels of the applied signals and pass the input terminal voltage through to an output side as an output voltage, said switching circuit supplying the output voltage thus obtained to said driving motor.

2. A transfer control device as claimed in claim 1 in which said square wave signal generating circuit is a monostable multivibrator, and said switching circuit is an analog switching circuit.

3. A transfer control device as claimed in claim 1 in which said second output port of said micro-computer produces a high-level signal during a normal transferring mode, and said switching circuit is connected to an output terminal of said square wave signal generating circuit and has a first input terminal applied with the output signal voltage from said output terminal, said switching circuit being applied with a high-level signal from said second output port to pass and produce a voltage applied to said first output port.

4. A transfer control device as claimed in claim 3 in which said first and second output ports of said micro-computer respectively produce a low-level signal and a high-level signal during a stop mode, said square wave signal generating circuit is applied with said low-level signal and not operated so that the output remains at low-level, and said switching circuit is applied with said high-level signal to pass and produce the low-level output of said square wave signal generating circuit applied to said first input terminal.

5. A transfer control device as claimed in claim 1 in which said first and second output ports of said micro-computer respectively produce low-level signals, said switching circuit has a second input terminal applied with a first predetermined voltage, and said switching circuit is applied with the low-level signals from said first and second output ports, to pass and produce the first predetermined voltage applied to said second input terminal.

6. A transfer control device as claimed in claim 5 in which said first and second output ports of said micro-computer respectively produce a high-level signal and a low-level signal during an intermediate-speed transferring mode, said switching circuit has a third input terminal applied with a second predetermined voltage which is smaller than said first predetermined voltage, and said switching circuit is applied with the respective high-level signal and the low-level signal from said first and second output ports, to pass and produce the second predetermined voltage applied to said third input terminal.

* * * * *